No. 12,595.
REISSUED JAN. 15, 1907.
R. LUNDELL.
ALTERNATING CURRENT MOTOR.
APPLICATION FILED SEPT. 29, 1906.
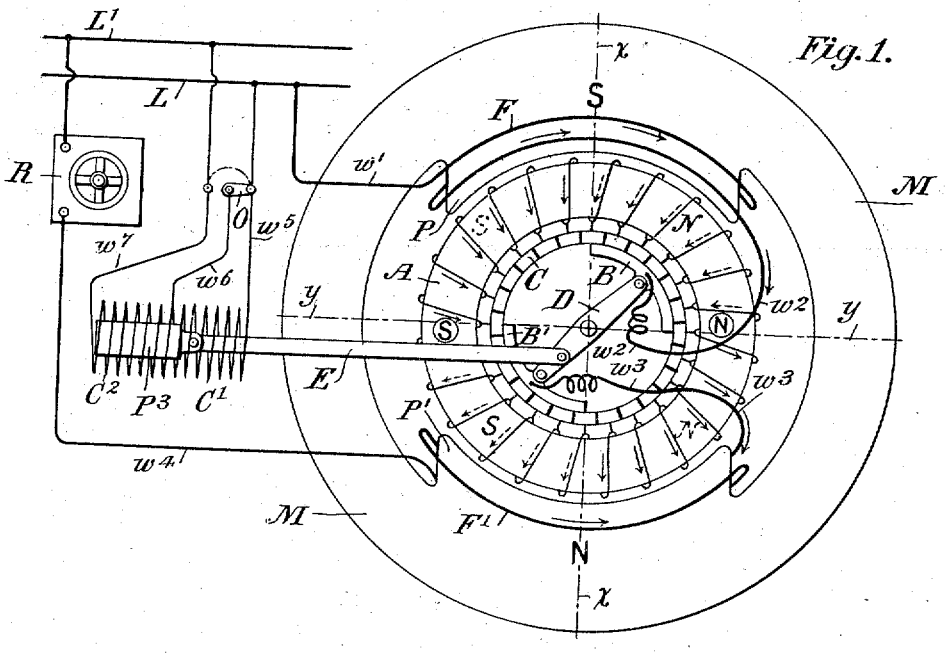
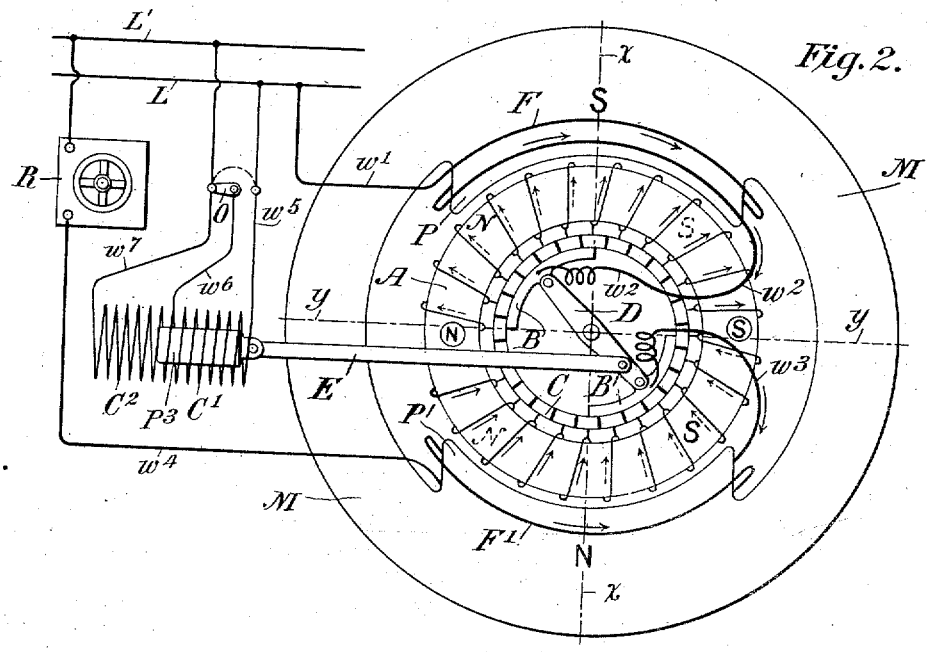
WITNESSES:
C. E. Ashley
M. F. Keating
INVENTOR
Robert Lundell
By his Attorney,
Charles J. Kintner

UNITED STATES PATENT OFFICE.

ROBERT LUNDELL, OF NEW YORK, N. Y.

ALTERNATING-CURRENT MOTOR.

No. 12,595. Specification of Reissued Letters Patent. Reissued Jan. 15, 1907.

Original No. 782,863, dated February 21, 1905. Application for reissue filed September 29, 1906. Serial No. 337,812.

*To all whom it may concern:*

Be it known that I, ROBERT LUNDELL, a citizen of the United States, residing at New York, borough of Manhattan, county and State of New York, have made a new and useful Invention in Alternating-Current Motors, of which the following is a specification, reference being made to the accompanying drawings, forming a part of the same.

My invention relates particularly to that class of alternating-current motors which are furnished with a commutator and which may be operated from a two-wire circuit; and it has for its objects, first, the construction of a motor which will give a great starting torque and a high efficiency; second, the construction of a motor which will operate without injurious sparking at the commutator under various loads and speeds; third, the construction of a motor which may quickly be reversed from a distance without undue complication.

I accomplish the aforesaid objects with the aid of the improved apparatus and by the methods hereinafter described, and fully illustrated in the accompanying drawings.

It is a well-known fact that if a laminated field-magnet is used in connection with an ordinary series-wound motor the same may be made to run on a single-phase alternating-current circuit. It is also well known that an armature having a commutator can be made to run in an alternating-current field if certain coils in the said armature are short-circuited upon themselves, though wholly disconnected from the primary circuit. An alternating-current commutator-motor has also been constructed prior to my invention (see British Patent No. 564, of 1887) in which the field-windings were connected in series with certain torque-producing portions of the armature-winding, while the other portions of the same armature-winding not producing torque were short-circuited by brushes arranged in pairs for such purpose. In the present invention I employ a combination of the principles which govern the operation of a series-wound motor and those which govern the rotation of a partly-short-circuited armature which is caused to rotate by the secondary or the induced currents in the short-circuited coils and I combine the torque effects of the applied currents and the induced currents in the armature-winding in such a manner that idle armature-coils or false currents in said coils (not producing torque) are avoided. With the aid of my improved apparatus I cause the currents in those armature-coils which are located at or near the leaving edges of the brushes to flow in the same direction, and I avoid also any great change in the current strength at these points in order to effectively prevent sparking at the brushes.

Referring now to the drawings, Figures 1 and 2 are both diagrammatic views of the apparatus. Fig. 2 is similar to Fig. 1, the only difference being that which results from reversing the direction of rotation of the rotary or movable part.

Referring to Fig. 1 in detail, L L′ represent the two wires or mains of an alternating-current supply. M represents the laminated field-magnet of a two-pole motor having poles P P′ and field-windings F F′, as clearly shown in the drawings. A represents the armature-core of a rotating armature having a "Gramme" or ring winding, as clearly shown, the coils of which are in turn connected to a commutator C in the usual manner. B B′ represent contact-blocks or brushes which are insulated from one another and which are wide enough to straddle or to connect a number of commutator bars and coils. D represents a rocker-arm or lever designed to move or regulate the position of the contact-blocks B B′. E is a rod which connects the said rocker-arm D to a core or plunger $P^3$, which in turn is designed to be moved by the solenoid-coils $C'$ $C^2$. The said coils $C'$ $C^2$ are operated by a small switch O, which may be located far from the apparatus. This switch is designed to short-circuit one or the other of the coils and to put both coils in circuit by opening the said switch. The coils $C'$ $C^2$ are for convenience shown connected to the alternating-current mains L L′, though it would be preferable to connect the same to a source of direct-current supply—such as a battery, for instance. R represents a suitable starting and regulating box for regulating the current-potential supplied to the motor. $w'$ $w^2$ $w^3$ to $w^7$ represent wires for connecting together electrically the various parts of the apparatus in the manner shown in the drawings. Wires $w^2$ and $w^3$, which lead to the contact-blocks B B′, are supposed to be flexible in order not to interfere with the movement of the said blocks.

In order to fully explain the combined action of the primary and the induced currents in the armature-windings, the direction of the current at one particular moment has been indicated upon the drawings by arrows which are shown in full if they pertain to the primary circuit and which are shown dotted if they pertain to the induced currents. The polarities are likewise indicated by letters S N, shown in full when they pertain to the primary currents and dotted when they pertain to the induced currents. The polarities S N shown in full within the small circles on the armature-core indicate the resultant or combined polarities due to both primary and the induced currents.

Looking now upon Fig. 1 as a plain series-wound motor, it will be understood by any one familiar with the art that if the direction of the current at one particular moment is as indicated by the arrows (shown in full) the polarities of the field-magnet poles will be as indicated by letters S N on the drawings. It will also be understood by following the arrows (shown in full) on the armature-core that the polarities from the primary current will be located opposite the center line of the brushes—that is, forty-five degrees from the line Y Y, as shown by letters S N (in full) on the armature-core. It follows from the location of these polarities that the rotation of the armature would be from right to left—that is, counter-clockwise—S on the field-magnet attracting N on the armature-core and N on the field-magnet attracting S on the armature-core. At the next instant, when the current has changed direction, all of the above-mentioned polarities would be reversed and the direction of rotation would be the same. Omitting now for the moment the action of the primary current in the armature-windings, it will also be understood by any one familiar with the art that there will be secondary currents induced in the armature-coils which are short-circuited by the wide contact blocks or brushes B B′ by reason of the lines of force which are caused to flow through the armature from the field-magnet poles N to S. The direction of these induced currents will be such that they will oppose the flow of lines of force—that is, they will be in opposite direction to the current which flows through the field-windings F and F′. If traced on the drawings, they will be found to be in the direction shown by the dotted arrows when induced by a current in the field-windings, which flows as indicated in Fig. 1. The polarities on the armature-core from these secondary currents will be as indicated by the dotted letters S and N, and it follows that the direction of rotation will be from right to left, or same as before, as S on the field-magnet will repel dotted S on the armature-core and N on the field-magnet will repel dotted N on the armature-core. At the next moment, when the currents are reversed, the polarities will likewise be reversed and the direction of rotation remains as before. Examining now the resultant action of both the primary and the secondary currents upon the armature-core, it will be seen that the combined polarities will be located on line Y Y, as indicated by the letters S and N within the small circles. This is exactly where the polarities should be located in order to produce the best torque effects and the best efficiency. In fact, if the motor were to be operated as a plain series-wound motor the ordinary narrow brushes would in this case be located at or near the line Y Y. Such a motor would, however, cause difficulties from sparking, due to the large secondary current in the armature-coil, which is directly short-circuited by the brush.

By my invention I propose to reduce the secondary or the induced current in any one coil to a normal amount by short-circuiting such a number of coils that the combined ampere-turns from the short-circuited portions of the armature will nearly equal the ampere-turns on the other portions of the armature, which are due to the primary currents.

It will be seen on the drawings that the induced and the primary currents in the armature-windings are in the same direction at the leaving edges of the contact-blocks B and B′—that is, at line X X on Fig. 1. If these currents are nearly alike in amperes, it follows that there will be no sparking as the commutator-segments leave the brushes, because of the fact that there will be no reversal or change in the current in the armature-windings at these particular points.

The position of the contact-blocks B B′ is directly governed by the position of the core $P^3$, as clearly shown in the drawings, and indirectly by the switch O, which, as stated before, may be at a considerable distance from the apparatus. The core $P^3$ may preferably be supplied with suitable stops for limiting the extreme positions, or similar stops may be caused to limit the movement of the rocker-arm D.

Fig. 2 shows the direction of the primary and the induced currents reversed in the armature-windings, owing to a change in the position of the contact-blocks B and B′. The resultant or combined polarities will consequently be reversed, as shown by letters N and S within the small dotted circles, and the direction of rotation will be from left to right, or in the direction of the hands on a clock. It may be interesting to note that the brushes or contact-blocks B B′ have only been moved ninety electrical degrees, whereas the resultant polarities of the armature have been shifted one hundred and eighty degrees. The same ratio will apply to a multipolar design.

I have illustrated a smooth-core ringwound armature for the sole purpose of plainly indicating the direction of the current in the coils. This form of armature is now obsolete, and I would naturally employ a slotted drum-wound armature, as well as a multipolar design, in a working machine. I have also shown and described a motor having certain coils in its armature-windings in series with its field-windings, and I do not limit my invention to this particular arrangement, as it is but a simple modification to so connect the circuits that the above-mentioned coils of the armature would be connected in parallel with the field-windings.

Having thus described my invention, what I claim, and desire to secure by Letters Patent of the United States, is—

1. An alternating-current motor having a stationary field-magnet and an armature of the ring or drum type, the coils of which are connected to a commutator, means for causing said armature to rotate from the propelling effect (torque effect) of short-circuited induced currents in certain groups of armature-coils; in combination with additional means for combining therewith the propelling effect (torque effect) of outside currents introduced into the other groups of armature-coils not short-circuited.

2. An alternating-current motor comprising the combination of a stationary field-magnet connected with a source of alternating-current supply, an armature having a winding the coils of which are connected to a commutator and means for causing a united propelling effect of the applied currents and the induced currents in the said armature-winding.

3. An alternating-current commutator-motor having a field-magnet connected with a source of alternating-current supply, an armature of the ring or drum type provided with means for causing a united propelling effect of the applied currents and the induced currents therein; in combination with additional means for reversing the direction of rotation.

4. A single-phase alternating-current machine comprising the combination of a stationary field-magnet having an energizing-winding, an armature having its coils connected to a commutator, wide brushes extending about ninety electrical degrees for short-circuiting certain groups of armature-coils at an angle of about forty-five electrical degrees to the field flux (field-magnet poles), with means for including the other armature-coils not short-circuited in an outside circuit.

5. A single-phase alternating-current motor comprising the combination of a stationary field-magnet having an energizing-winding, an armature having its coils connected to a commutator, brushes for short-circuiting certain groups of armature-coils at an angle of about forty-five electrical degrees to the field-magnet poles, means for including the other armature-coils not short-circuited in an outside circuit, and additional means for reversing the direction of rotation.

6. An alternating-current machine having a stationary field-magnet with an energizing-winding therefor, an armature having its winding or coils connected to a commutator, wide brushes extending about ninety electrical degrees for causing induced currents to flow through certain groups of armature-coils; in combination with means for causing the currents in those armature-coils which are located at or near the leaving edges of the brushes to flow in the same direction.

7. An alternating-current motor having a field-magnet connected with a source of current-supply and an armature with a commutator and brushes for short-circuiting two or more groups of armature-coils while the remaining armature-coils are included in an alternating-current-supply circuit; in combination with means for changing the position of the brushes and thereby the direction of rotation.

In testimony whereof I have signed my name to this specification in the presence of two subscribing witnesses.

ROBERT LUNDELL.

Witnesses:
C. J. KINTNER,
M. F. KEATING.